(12) United States Patent
Matko et al.

(10) Patent No.: US 6,762,790 B1
(45) Date of Patent: Jul. 13, 2004

(54) UNIVERSAL CAMERA BRACKET THAT ALLOWS 180 DEGREE OF PITCH ADJUSTMENT

(75) Inventors: Mark A. Matko, North Olmstead, OH (US); Darwin A. Garrison, Brunswick, OH (US); Christine G. Swansegar, North Olmstead, OH (US)

(73) Assignee: Bendix Commercial Vehicle Systems LLC ( * ) Notice: Subject to any disclaimer, the term of this patent is extended or adjusted under 35 U.S.C. 154(b) by 0 days.

(21) Appl. No.: 10/324,879

(22) Filed: Dec. 20, 2002

(51) Int. Cl.[7] .............................. H04N 7/18; H04N 9/47; G03B 17/00
(52) U.S. Cl. ..................... 348/148; 348/143; 348/373; 348/375; 396/427; 396/428; 250/239; 257/433
(58) Field of Search ............................ 348/73, 75, 95, 348/208.7, 336.06, 333.07, 373, 375, 374, 376, 118, 148, 143, 787, 836; 396/342, 427, 428, 419, 341, 343, 344, 345, 347; 250/239; 257/433

(56) References Cited

U.S. PATENT DOCUMENTS

| | | | | |
|---|---|---|---|---|
| 4,318,135 A | * | 3/1982 | Allis et al. ................... | 358/474 |
| 4,406,490 A | * | 9/1983 | Torii et al. ................... | 362/497 |
| 4,457,017 A | * | 6/1984 | Onogi et al. ................. | 382/295 |
| 4,736,218 A | * | 4/1988 | Kutman ....................... | 396/427 |
| 4,794,414 A | | 12/1988 | Kozina et al. | |
| 4,829,983 A | * | 5/1989 | West et al. ................. | 122/17.1 |
| 4,833,534 A | * | 5/1989 | Paff et al. ................... | 348/151 |
| 4,859,847 A | * | 8/1989 | Matsuno et al. ............. | 250/239 |
| 5,028,997 A | * | 7/1991 | Elberbaum ................... | 348/143 |
| 5,159,368 A | | 10/1992 | Zemlin | |
| 5,260,731 A | | 11/1993 | Baker, Jr. | |
| 5,293,719 A | * | 3/1994 | Sugda ........................... | 52/21 |
| 5,798,879 A | * | 8/1998 | Salvio ......................... | 359/857 |
| 5,823,495 A | * | 10/1998 | Joss et al. ................. | 248/309.1 |
| 5,850,579 A | | 12/1998 | Melby | |
| 5,956,079 A | * | 9/1999 | Ridgley ....................... | 348/89 |
| 6,116,485 A | * | 9/2000 | Watkins ..................... | 224/275 |
| 6,116,556 A | | 9/2000 | Roth | |
| 6,149,112 A | | 11/2000 | Thieltges | |
| 6,231,017 B1 | | 5/2001 | Watkins | |
| 6,351,288 B1 | * | 2/2002 | Johnson et al. ............. | 348/373 |
| 6,354,544 B1 | | 3/2002 | Muzila | |
| 6,375,369 B1 | * | 4/2002 | Schneider et al. .......... | 396/427 |
| D456,821 S | * | 5/2002 | Ege et al. ................... | D15/28 |
| 6,421,231 B1 | * | 7/2002 | Jung .......................... | 361/681 |
| 6,594,600 B1 | * | 7/2003 | Arnoul et al. ............... | 702/94 |
| 2002/0130230 A1 | * | 9/2002 | Ursan et al. ............. | 248/184.1 |

FOREIGN PATENT DOCUMENTS

RU 2163961 C1 * 3/2001 ........... E04F/13/12

OTHER PUBLICATIONS

U.S. patent application Publication No: 2002/0130230 A1□□Ursan et al□□Camera Gimbal□□Sep. 19, 2002□□ 248/184.1□□.*

* cited by examiner

Primary Examiner—Andrew Christensen
Assistant Examiner—Brian Genco
(74) Attorney, Agent, or Firm—Calfee, Halter & Griswold LLP

(57) ABSTRACT

A universal bracket is disclosed that allows 180 degree of pitch adjustment for a camera. The camera has two brackets that can adapt to various mounting angles on any vehicle surface configuration. In addition, the universal bracket is designed to be rigid and prevent the camera from vibrating in order to prevent a blurred picture on a display unit The system is designed to be installed by a single person.

7 Claims, 6 Drawing Sheets

UNIVERSAL CAMERA BRACKET THAT ALLOWS 180 DEGREE OF PITCH ADJUSTMENT

FIELD OF THE INVENTION

The present invention is directed to the art of brackets. More particularly, the invention relates to a universal camera bracket. This application includes some subject matter previously disclosed in co-pending U.S. patent application Ser. No. 09/996,152 which is owned in common by the assignee of the present invention, and which the disclosure is fully incorporated herein by reference.

BACKGROUND OF THE INVENTION

There is constant improvement in innovation to try to make driving more safe in less than ideal driving conditions. One way this has been achieved is by using thermal imaging cameras. Through the use of infrared technology, a thermal imaging camera mounted on a vehicle will improve a driver's visibility at night by extending the driver's vision in front of the vehicle beyond the illumination distance of the headlamps. Therefore, seeing farther in front of the vehicle allows for advanced detection of obstacles, such as pedestrians, animals, stalled cars, road debris, road construction, bridges, unmarked roads, etc., and a greater reaction time by the driver.

For example, in the commercial trucking industry the camera is externally mounted to the surface of the vehicle with a rigid bracket assembly. The thermal imaging camera is able to sense heat from the environment and processes the signals electronically. Those electronic signals are transformed into a virtual image projected onto an in-cab display mounted just below or above the driver's line of sight. The driver glances at the display just like passenger car drivers glance at a rear-view mirror.

Being mounted externally to the vehicle, there are many problems for the rigid bracket assembly to overcome. The weather, such as rain, snow, hail, and wind, as well as vibration, can cause the camera bracket assembly to loosen and eventually fall off the vehicle or dislodge the camera from a fixed position, therefore the camera will not be projecting images on the display of what is directly in front of the vehicle. Any type of vibration of the camera bracket will cause the image from the camera to blur on the display unit. In addition, the shape of the vehicle's surface presents an obstacle for the rigid bracket assembly to be mounted. The rigid bracket needs to be level to ground in order for the camera to be pointed directly forward. The natural mechanical vibrations of the vehicle can cause the image on the driver's display to vibrate, therefore the bracket assembly must be rigid to prevent vibration.

Accordingly, the need exists for a universal camera bracket to withstand weather conditions, accommodate various shaped roof-tops or hoods, and maintain image stability.

SUMMARY OF THE INVENTION

The present invention provides for a universal bracket for a thermal imaging camera on a vehicle. The universal bracket includes a base bracket adapted to be mounted to a roof-top of the vehicle having a base member with two identical opposing arms extending from the ends of the base member. Each standoff has a top end and a bottom end. The arms are perpendicularly adjacent to the base member at a bend. In addition, the universal bracket includes a camera bracket adapted to be mounted to the base bracket having a back member with two identical opposing side extending members extending from the ends of the back member. Each side arm has a top end and a bottom end. The side extending members are perpendicularly adjacent to the back member at a bend.

Also, the present invention provides for a method of installing a universal camera bracket to a truck. The method includes fastening a base bracket to a roof-top of the truck, connecting a camera bracket to the base bracket, securing a camera to the camera bracket, and adjusting the position of the camera.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE INVENTION

The present invention is an adaptable universal camera bracket which is adjustable to meet varied driving and weather conditions and varied vehicle surfaces for mounting a camera, i.e., thermal image camera, that will aid a vehicle driver in driving conditions or monitoring the exterior or interior of the vehicle, for example, surveillance or security. The universal bracket is designed to be mounted in different mounting locations on a vehicle with a surface either horizontal, vertical, or at any vertical angle from 0 to 180 degrees. In addition, the universal camera bracket allows the camera to be stable against vibrations so images shown a display are not blurred.

Figure 1:
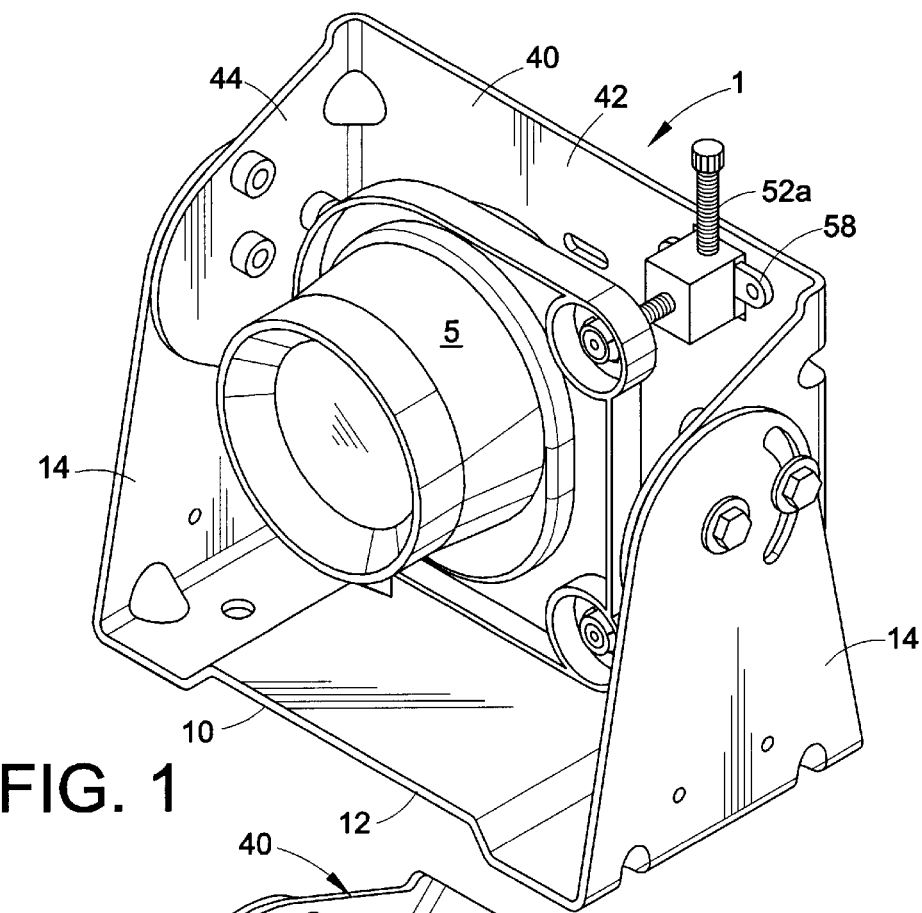
FIG. 1 shows a perspective view of the preferred embodiment of an assembled universal camera bracket with a camera installed.

The invention for a universal camera mounting bracket 1 assembly will be described with reference to the drawings, but is not limited to the described embodiments. The assembly, as shown in FIG. 1, includes two separate brackets, a base bracket 10 and a camera bracket 40. A thermal imaging camera 5 to assist a driver in nighttime driving is fastened to the camera bracket 40 which in turn is fastened to the base bracket 10. The assembly is mounted to a vehicle, such as a tractor trailer, commercial or school bus, fire truck, delivery truck, etc., on the roof-top preferably above the driver.

Figure 7:
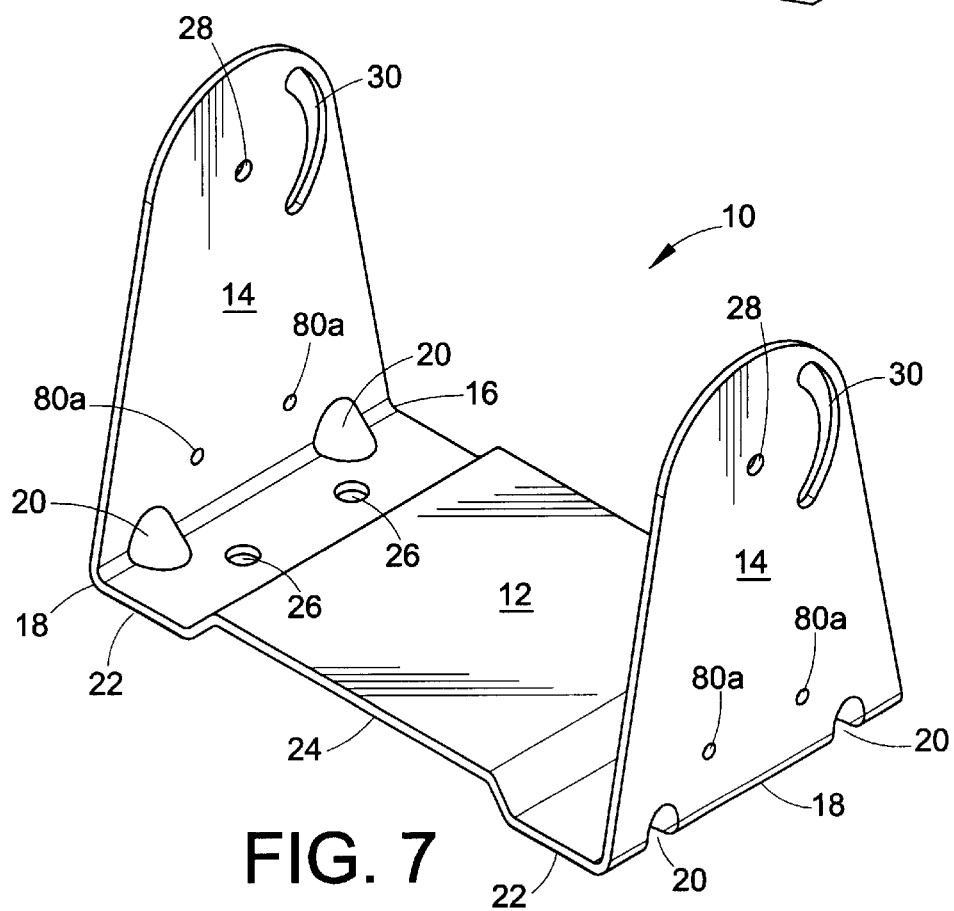
FIG. 7 shows a perspective view of the base bracket of the preferred embodiment.

As shown in FIG. 7, the base bracket 10 includes a base member 12 with two identical opposing arms 14 that perpendicularly extend from the ends 16 of the base member 10. The connection of the arms 14 and base member 12 creates a corner 18. During the forming process of the base bracket 10, strengtheners 20 are formed directly into the corners 18 of the base bracket 10. The strengtheners 20 make the base bracket 10 more rigid which will prevent vibration of the camera 5.

The base member 12 of the base bracket 10 has two end sections 22 and a midsection 24 which is between the end sections 22. To accommodate for a vehicle surface that is not flat, the midsection 24 is greater in height than the end sections 22. Fastening holes 26 are included in the end sections 22 for mounting the base bracket 10 to the surface of the vehicle.

The arms 14 of the base bracket 10 have an aperture 28 for securing the base bracket 10 to the camera bracket 40 in addition to an arcuate slot 30. The arcuate slot 30 has a 90 degree arch and allows for 180 degrees of total pitch adjustment, in combination with the camera bracket 40, for the assembly.

Figure 10:
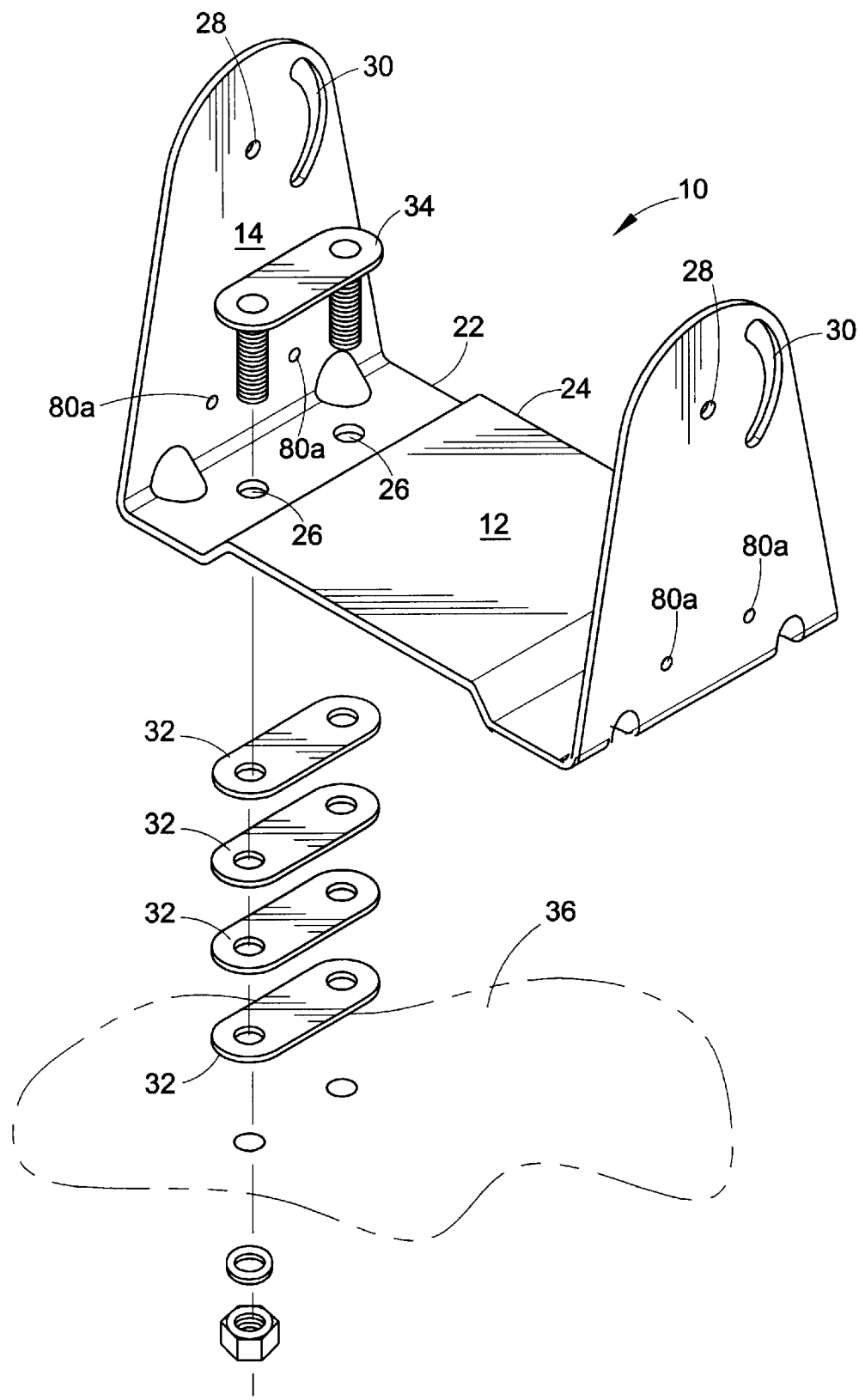
FIG. 10 shows an exploded view of the components for mounting the base bracket to a non-level surface of a vehicle.

When mounting the base bracket 10 to the surface of the vehicle, as shown in FIG. 10, it is preferred that the base bracket 10 be level. If the vehicle surface for the bracket to be mounted to is not level, spacers 32 are stacked up underneath the base member 12 to raise one end of the base bracket 10 and to accommodate for various shaped vehicle surfaces. The spacers 32 are aligned with the fastening holes 26 in the end sections 22 underneath the bottom side of the base member 12. This allows for one side of the base bracket 10 to be raised and in addition to making the camera bracket 40 horizontally level to the road after assembled to the base bracket 10 and allow the camera 5 to be pointed directly forward and level, rather than tilted off to a side, in front of the vehicle. A stud plate 34 on each end section 22 of the base member 12 is fastened through the base member 12, any required spacers 32, and the surface 36 of the vehicle. Generally, the stud plate 34 is secured, for example, with locknuts and therefore, the base bracket 10 is mounted to the surface of the vehicle.

Figure 6:
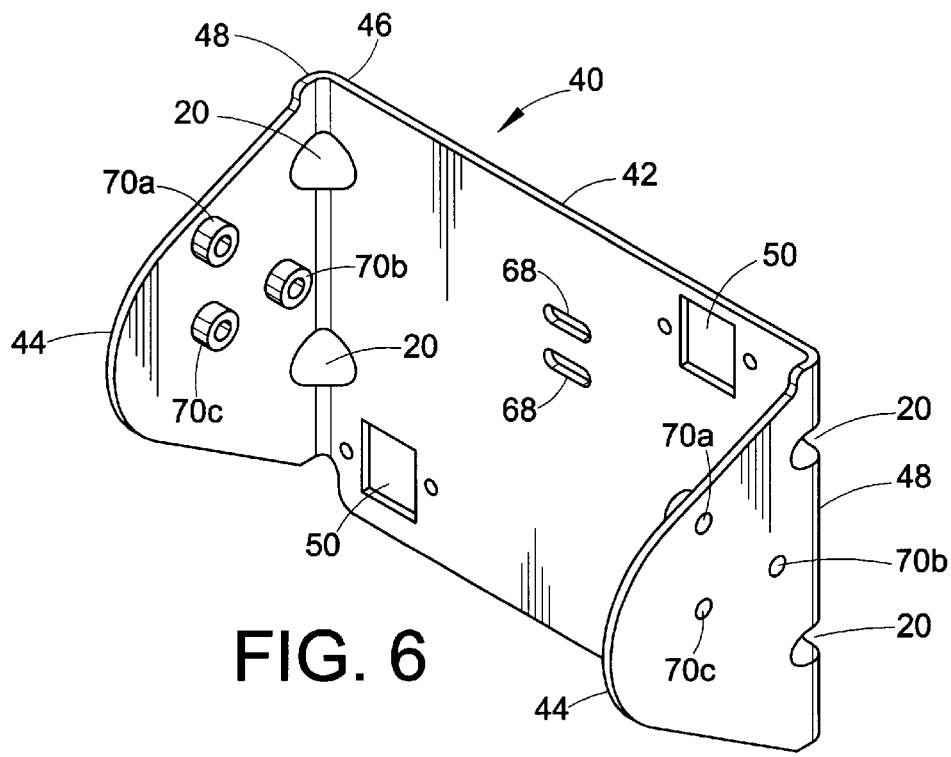
FIG. 6 shows a perspective view of the camera bracket of the preferred embodiment.

As shown in FIG. 6, the camera bracket 40 includes a back member 42 with two opposing extending members 44 that extend perpendicularly from the ends 46 of the back member 42. The connection of the extending members 44 and back member 42 forms a corner 48 which is rounded.

Figure 4:
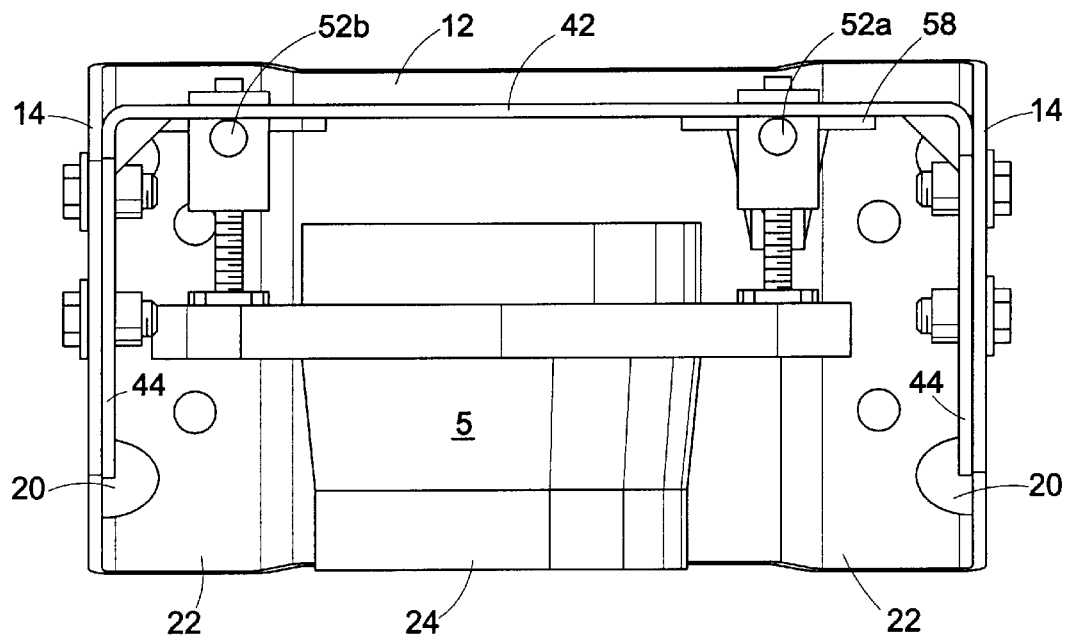
Figure 5:
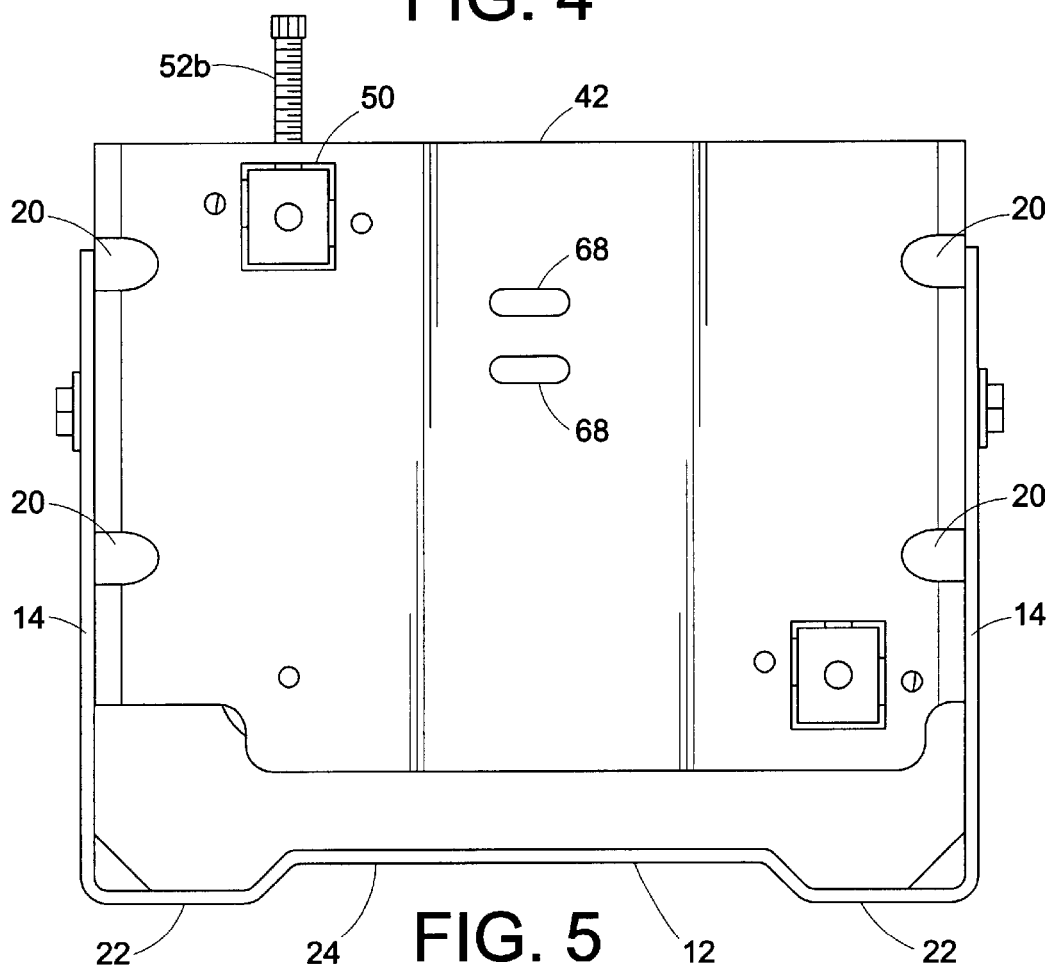

The back member 42 of the camera bracket 40 has two square apertures 50, shown in FIG. 6, for housing aiming adjusters 52a, 52b shown in FIG. 4. The aiming adjusters 52a and 52b, along with a pivot assembly 54 shown in FIG. 2, allow the camera 5 to be adjusted and aimed in the proper direction for the driver to see the road in front of the vehicle. The aiming adjusters 52a, 52b together with the pivot assembly 54 allow selective pivoting of the camera 5 about two perpendicular axes. Thus, the aiming axis or focal direction of the camera 5 can be selectively oriented about the two axes by selectively advancing and retracting, i.e., altering, the aiming adjusters 52a, 52b. In FIG. 4, the aiming adjusters 52a, 52b are secured to the back member 42 with fasteners (not shown) through retaining lugs 58 on the aiming adjusters. Preferably, the aiming adjusters 52a, 52b and the pivot assembly 54 are pre-fastened to the camera bracket 40 in the manufacturing facility.

Figure 2:
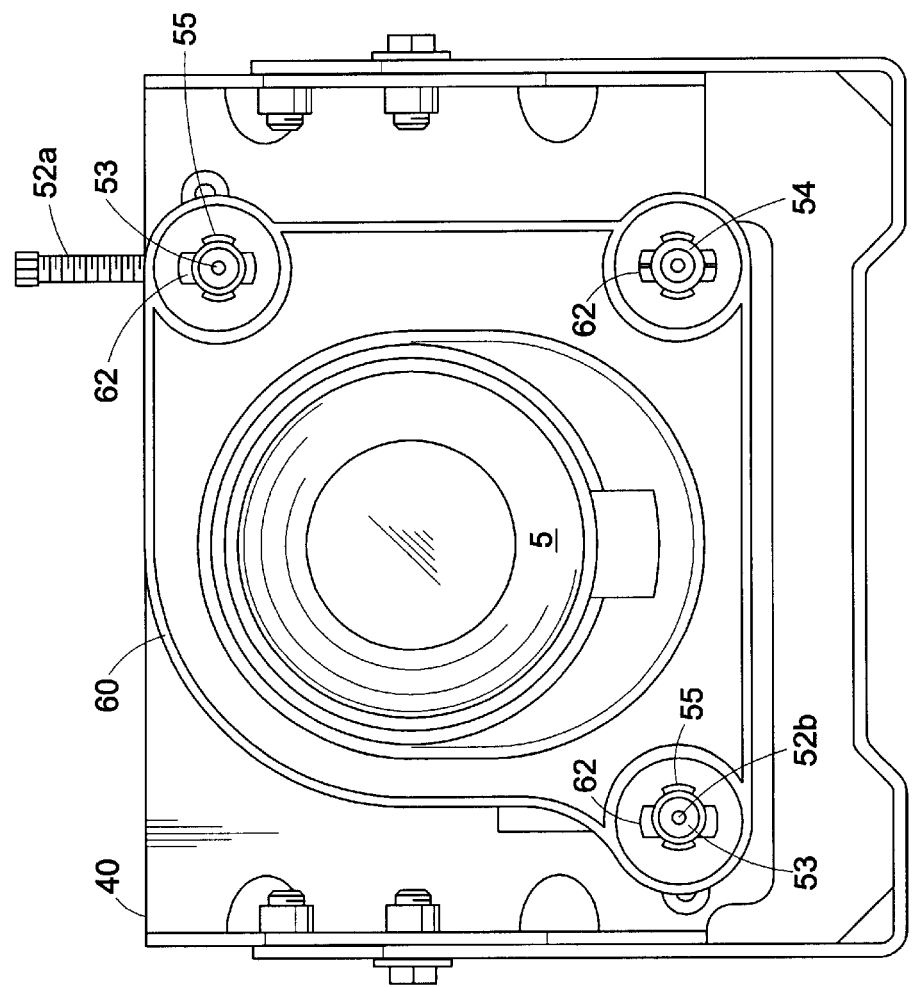

The camera 5 is fastened to the aiming adjusters 52a, 52b and the pivot assembly 54 with a camera frame or housing 60 shown in FIG. 2. The housing 60 has slots 62 to receive a first end 53 with tabs 55 of the aiming adjusters 52a, 52b and pivot assembly 54. Once the first ends 53 are received by the slots 62, the tabs 55 are turned approximately 90 degrees to lock the camera 5 to the camera bracket 40.

In addition, the back member 42 of the camera bracket 40 has two holes or slots 68, shown in FIG. 6, for a pull-tie to secure a harness (not shown) for the camera 5. Once the harness is in place, the pull-tie is tightened to secure the harness from moving. The harness is hooked into the camera 5. If the harness is pulled too tight, the seal for the wires in the harness will be compromised and water would eventually damage the product. If the harness is left too loose and exposed beyond the perimeter of the camera 5, the exposed harness may chafe damaging the wires. Therefore, the pull-tie slots 68 allow for the harness to be fastened safely behind the camera.

Figure 8:
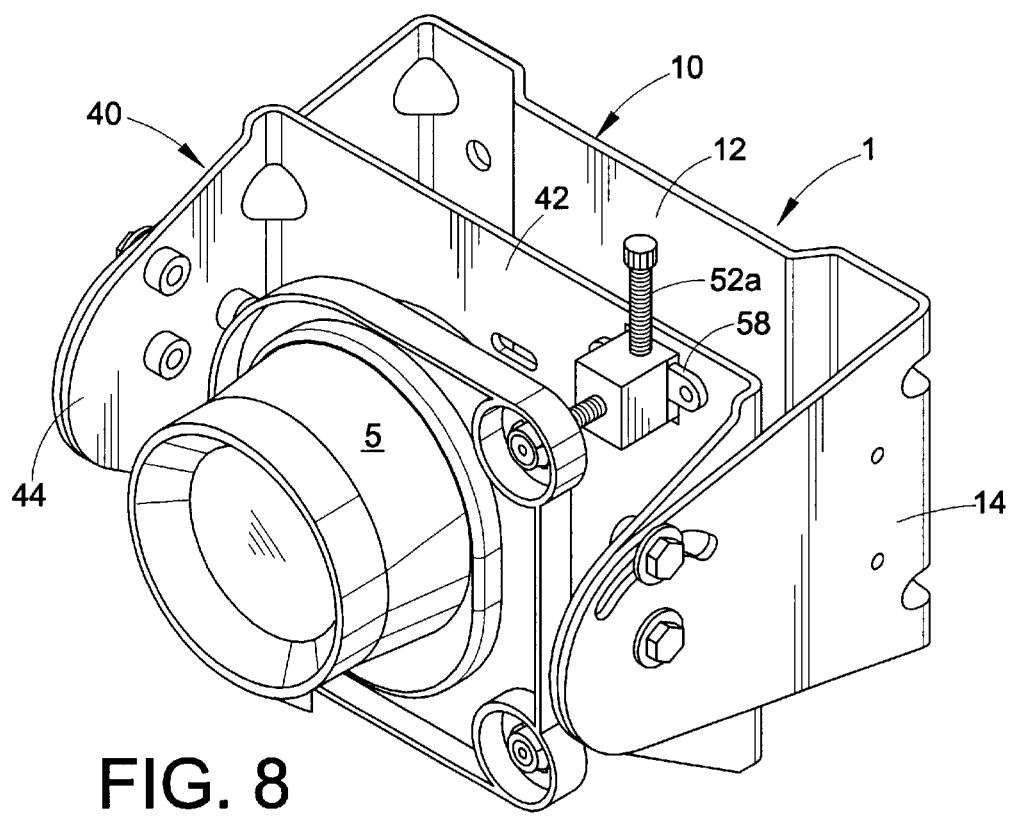
FIG. 8 shows an alternative embodiment of an assembled universal camera bracket.

The side extending members 44 of the camera bracket 40 include three threaded nut inserts 70a, 70b, 70c, shown in FIG. 6. The inserts 70a, 70b, 70c are formed into the camera bracket 40 during the manufacturing process. The inserts 70a, 70b, 70c are used to fasten the camera bracket 40 to the base bracket 10. Only two of the three threaded inserts 70 on each side arm 44 are used at the same time. Insert 70c is used for both assemblies. Depending on if the camera 5 is to be horizontally mounted, as shown in FIG. 1, or vertically mounted, as shown in FIG. 8, will determine which of the remaining two inserts, 70b or 70a are used. Insert 70b is used for a horizontal mount (FIG. 1) and insert 70a is used for a vertical mount (FIG. 8).

Figure 11:
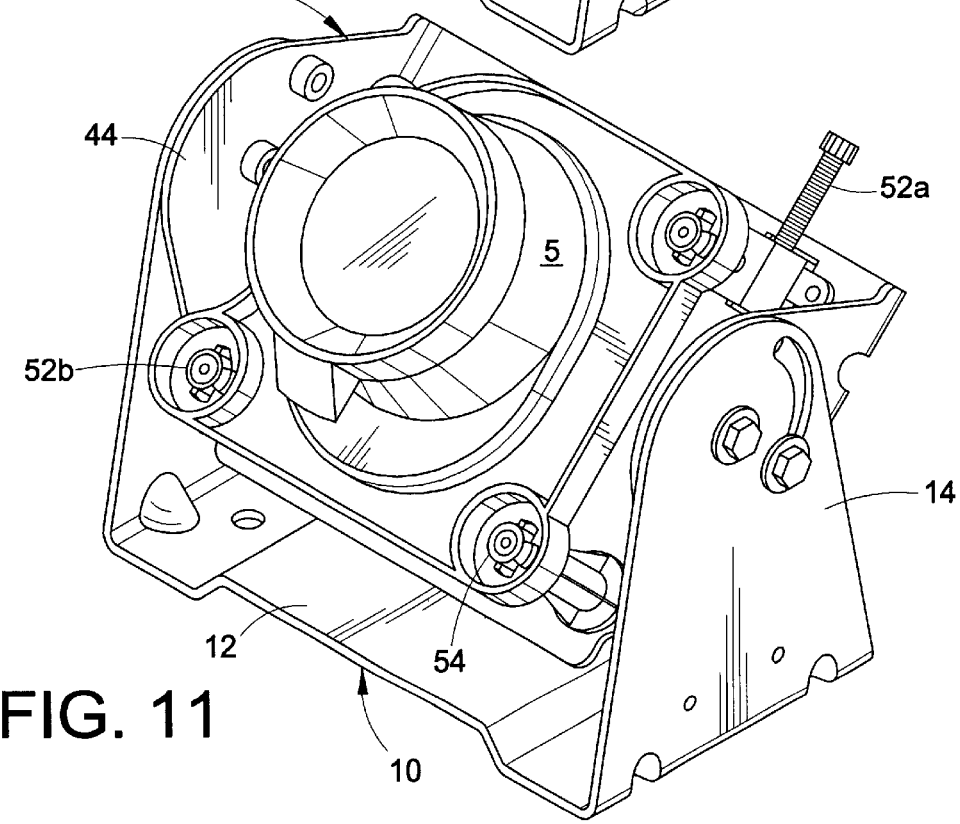
FIG. 11 shows a perspective view of the assembled universal camera bracket in an angled position for a non-horizontal or non-vertical surface.
Figure 3:
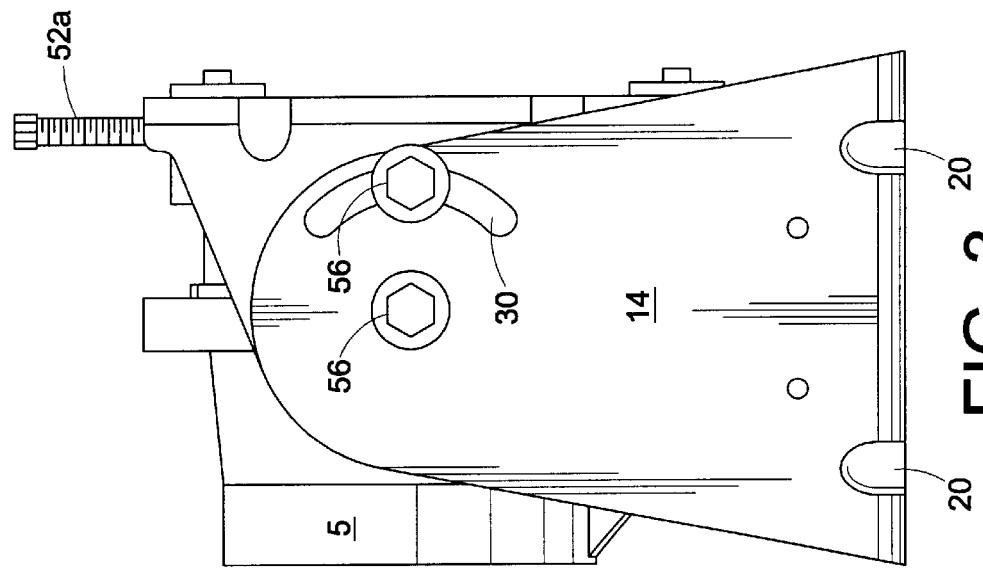
FIGS. 2–5 show a front view, a side view, a top view, and a back view of the preferred embodiment assembled universal camera bracket with a camera installed.

The aperture 28 on the standoff 14 of base bracket 10 aligns with threaded insert 70c on the camera bracket 40. Depending on which mount is to be used, threaded insert 70b or 70a will align with the arcuate slot 30 of base bracket 10. As shown in FIG. 3, fasteners 56 are threaded through the alignments of the aperture 28 with insert 70c and the slot 30 with either insert 70a or 70b to secure the camera bracket 40 to the base bracket 10. If the base member 12 of the base bracket 10 is not parallel or perpendicular with the ground, the arcuate slots 30 help adjust and angle the camera bracket 40 in order for the back member 42 of the camera bracket 40 to be perpendicular with the ground. FIG. 11 illustrates how the arcuate slot 30 is able to adjust the camera bracket 40 from being at a right angle with the base bracket 10.

After mounting and assembling the unit, the camera 5 must be adjusted to align the image on the display, which will be located inside the vehicle, preferably where the driver can view image, such as on the dashboard, or directly above where a sun visor would be located. To adjust the image and where the camera is pointing, the installer will move the aiming adjusters 52a, 52b to pivot the camera 5. Aiming adjuster 52a will pivot the camera +/−4 degrees up or down, and aiming adjuster 52b will pivot the camera +/−4 degrees left or right. Both adjustments cause the camera 5 to pivot against the pivot assembly 54. The universal camera bracket assembly is designed to be a one-man installment.

Figure 9:
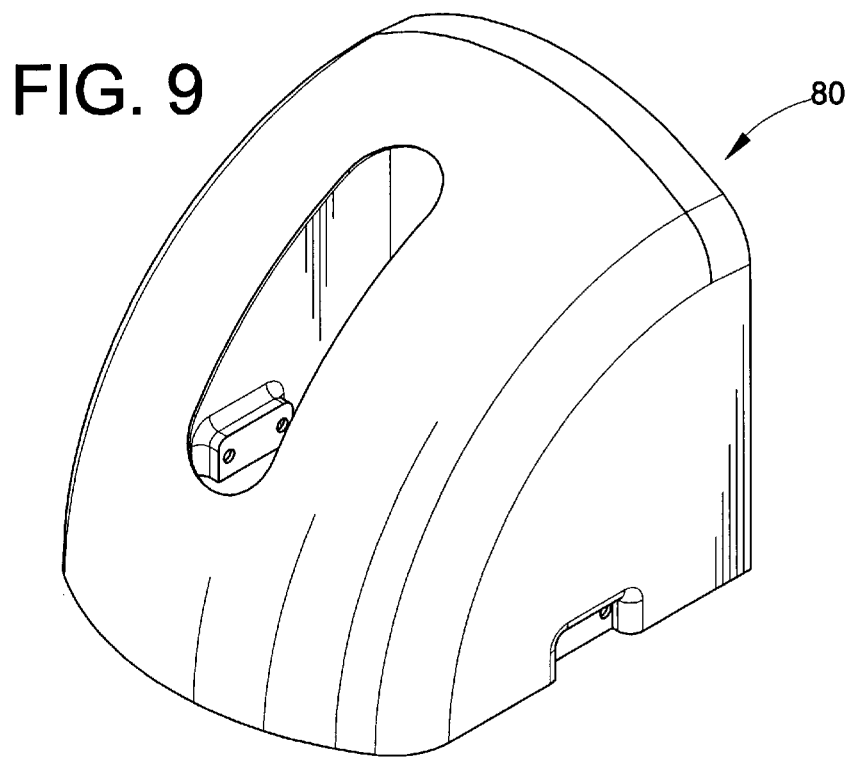
FIG. 9 shows a perspective view of one embodiment of a camera cover for the present invention.

As shown in FIG. 9, an optional camera cover or shroud 80 may be fastened to the assembled universal camera bracket 1. The camera cover 80 is secured to the arms 10 of the base bracket 10 and has an aperture 85 in the front large enough to not block the view from the camera from taking pictures. The base bracket 14 includes threaded inserts 80a for the purpose of fastening the camera cover 80 to the bracket. As an accessory, the camera cover 80 is used to cover the universal camera bracket 1 to protect the camera 5 from the elements of weather and to improve overall aesthetics threaded inserts 80a for the purpose of fastening the camera cover 80 to the bracket. As an accessory, the camera cover 80 is used to cover the universal camera bracket 1 to protect the camera 5 from the elements of weather and to improve overall aesthetics.

The foregoing description is, at present, considered to be preferred embodiments of the present invention. However, it is contemplated that various changes and modifications apparent to those skilled in the art may be made without departing from the present invention. Therefore, the foregoing description is intended to cover all such changes and modifications encompassed within the spirit and scope of the present invention, including all equivalent aspects.

It is claimed:

1. A universal camera bracket for use on a vehicle, comprising:

a base bracket including a base leg and two end legs extending from said base leg, said base leg being adapted to be mounted on a surface, each one of said end legs having a respective pivot opening centered on a pivot axis of said bracket, each one of said end legs having a respective first arcuate slot that is centered on said pivot axis and that has a first radius of curvature;

a camera bracket including a base leg and two end legs extending from said base leg, said base leg of said camera bracket being adapted to support a camera, each one of said end legs of said camera bracket having a pivot opening on said pivot axis and having first and second adjustment openings spaced from said pivot axis by a distance equal to said first radius of curvature;

pivot members extending through said pivot openings of said camera bracket end legs and said pivot openings of said base bracket end legs to support said camera bracket on said base bracket for pivotal movement relative to said base bracket about said pivot axis and relative to a surface on which said base bracket is mounted;

adjustment members extensible through said first adjustment openings of said camera bracket end legs and through said first arcuate slots of said base bracket end legs thereby to adjustably position and lock said camera bracket in any selected one of a plurality of different pivot positions relative to said base bracket when said base leg of said base bracket is mounted on a generally horizontal surface;

said adjustment members being extensible through said second adjustment openings of said camera bracket end legs and through said first arcuate slots of said base bracket end legs thereby to adjustably position and lock said camera bracket in any selected one of a plurality of different pivot positions along an arcuate path relative to said base bracket when said base leg of said base bracket is mounted on a generally vertical surface.

2. A bracket as set forth in claim 1 wherein:

said camera bracket is pivotable on said base bracket within about a ninety degree range centered on the horizontal when said adjustment members extend through said first adjustment openings of said camera bracket end legs and through said first arcuate slots of said base bracket end legs and said base leg of said base bracket is mounted on a generally horizontal surface;

said camera bracket is pivotable on said base bracket within about a ninety degree range centered on the horizontal when said adjustment members extend through said second adjustment openings of said camera bracket end legs and through said first arcuate slots of said base bracket end legs when said base leg of said base bracket is mounted on a generally vertical surface.

3. A bracket as set forth in claim 1 further including first and second aiming adjusters on said camera bracket for supporting a camera on said camera bracket, said first aiming adjuster being adjustable within a range of up to about ten degrees in a first direction and said second aiming adjuster being adjustable within a range of up to about ten degrees in a second direction perpendicular to said first direction.

4. A bracket as set forth in claim 1 further including first and second aiming adjusters on said camera bracket for supporting a camera on said camera bracket, said first aiming adjuster being adjustable within a range of up to about ten degrees in a first direction and said second aiming adjuster being adjustable within a range of up to about ten degrees in a second direction perpendicular to said first direction.

5. A bracket as set forth in claim 3 further including a pivot assembly on said camera bracket, said first and second aiming adjusters and said pivot assembly together supporting a camera on said camera bracket, said camera pivoting about said pivot assembly relative to said camera bracket during adjustment of said first and second aiming adjusters.

6. A bracket as set forth in claim 1 wherein said base leg of said base bracket includes first and second fastener openings, said bracket further including a stud plate comprising first and second studs and a cross-piece joining said first and second studs, said first and second studs being extensible through said first and second fastener openings in said base leg of said base bracket and said cross-piece holding said stud plate on said base bracket, said bracket further including a plurality of spacers that can selectively be associated with said first and second studs of said stud plate during mounting or said base bracket to a surface with said first and second studs to change the orientation of said base bracket relative to the surface on which said base bracket is mounted.

7. A bracket as set forth in claim 3 wherein said base leg of said base bracket includes first and second fastener openings, said bracket further including a stud plate comprising first and second studs and a cross-piece joining said first and second studs, said first and second studs being extensible through said first and second fastener openings in said base leg of said base bracket and said cross-piece holding said stud plate on said base bracket, said bracket further including a plurality of spacers that can selectively be associated with said first and second studs of said stud plate during mounting or said base bracket to a surface with said first and second studs to change the orientation of said base bracket relative to the surface on which said base bracket is mounted.

* * * * *